United States Patent [19]
Sato et al.

[11] Patent Number: 5,142,699
[45] Date of Patent: Aug. 25, 1992

[54] RADIO RECEIVER WITH CLOCK SIGNAL CONTROLLED TO IMPROVE THE SIGNAL TO NOISE RATIO

[75] Inventors: Toshifumi Sato; Motoki Ide, both of Tokyo, Japan

[73] Assignee: NEC Corporation, Japan

[21] Appl. No.: 759,040

[22] Filed: Sep. 5, 1991

Related U.S. Application Data

[63] Continuation of Ser. No. 380,633, Jul. 14, 1989, abandoned.

[30] Foreign Application Priority Data

Jul. 15, 1988 [JP] Japan .................. 63-175213

[51] Int. Cl.⁵ .............................................. H04B 1/16
[52] U.S. Cl. .................................. 455/343; 340/825.44
[58] Field of Search ............... 455/228, 229, 38, 343, 455/127; 340/825.44, 825.48, 825.53, 311.1

[56] References Cited

U.S. PATENT DOCUMENTS

| | | | |
|---|---|---|---|
| 4,673,892 | 6/1987 | Miyashita et al. | 455/343 |
| 4,743,864 | 5/1988 | Nakagawa et al. | 455/343 |
| 4,802,240 | 1/1989 | Yamaguchi et al. | 455/343 |
| 4,855,731 | 8/1989 | Yoshizawa et al. | 340/825.44 |
| 4,860,005 | 8/1989 | DeLuca et al. | 455/343 |
| 4,903,335 | 2/1990 | Shimizu | 340/825.44 |
| 4,928,086 | 5/1990 | Drapac et al. | 340/825.44 |

*Primary Examiner*—Curtis Kuntz
*Attorney, Agent, or Firm*—Laff, Whitesel, Conte & Saret

[57] ABSTRACT

In a radio paging receiver comprising a receiving section (11), a decoder section (12), and a CPU (13) for distinguishing a specific one of a plurality of call signals and processing a specific message signal succeeding the specific call signal into a processed message signal, the receiving section is intermittently put into operation. The decoder section is put into operation in accordance with a first clock signal which is supplied from a first clock generator (16). A switching circuit (20) selectively connects the CPU with the first clock generator and a second clock generator (17). More particularly, the CPU is put into operation in accordance with a second clock signal which is supplied from the second generator when the receiving section does not operate. The frequency of the second clock signal is much higher than that of the first clock signal. Therefore, the CPU processes the specific message signal into the processed message signal at a rapid processing speed in accordance with the second clock signal when the receiving section is not put into operation.

7 Claims, 9 Drawing Sheets

RADIO RECEIVER WITH CLOCK SIGNAL CONTROLLED TO IMPROVE THE SIGNAL TO NOISE RATIO

This application is a continuation of application Ser. No. 07/380,633, filed Jul. 14, 1989, now abandoned.

BACKGROUND OF THE INVENTION

This invention relates to a radio communication apparatus for selectively receiving a call signal and an additional or message signal succeeding the call signal. The radio communication apparatus may be a radio paging receiver, a transceiver, or the like although description will be mainly directed to the radio paging receiver.

A radio paging receiver of the type described comprises a receiving section for receiving a plurality of call signals and a plurality of message signals succeeding the call signals, respectively, as received signals. The received signals are supplied to a decoder section to be decoded. More specifically, the decoder section is for distinguishing a specific one of the call signals from other call signals that is specific to the paging receiver. When the specific call signal is distinguished from other call signals, the decoder section receives a message signal succeeding the specific call signal. The message signal is supplied to a central processing unit (CPU) to be processed and to be stored in an RAM and displayed.

In a conventional paging receiver, the receiving section is intermittently put into operation for saving an electric power supplied to the paging receiver. The decoder section and the CPU are operated by clock signals different from each other. The decoder section operates in accordance with a first clock signal having a first frequency. The CPU operates in accordance with a second clock signal which has a second frequency which is higher than the first frequency. The first and second clock signals are supplied to the decoder section and the CPU from a clock generating section which serves as an operating section.

When the receiving section is put into operation, the CPU operates in accordance with the second high speed clock signal. As a result, the receiving section has a signal to noise ratio which is influenced by noise caused by the second clock signal. Namely, it is difficult to maintain a satisfactory signal to noise ratio in the conventional radio paging receiver.

SUMMARY OF THE INVENTION

It is therefore an object of this invention to provide a radio communication apparatus which is capable of improving signal to noise ratio.

Other objects of this invention will become clear as the description proceeds.

A radio communication receiver to which this invention is applicable comprises receiving means intermittently put into operation for receiving a plurality of call signals and a plurality of additional signals succeeding the call signals, respectively, distinguishing means connected to the receiving means for distinguishing a specific one of the call signals specific to the apparatus to receive an additional signal succeeding the specific call signal, processing means connected to the distinguishing means for processing the specific additional signal into a processed additional signal, and operating means for operating the distinguishing means and the processing means. According to this invention, the operating means comprises first clock generating means for generating a first clock signal having a first frequency, second clock generating means for generating a second clock signal having a second frequency higher than the first frequency, first supplying means for supplying the distinguishing means with the first clock signal to operate the distinguishing means, and second supplying means for supplying the processing means with the first clock signal and stopping generation of the second clock signal when the receiving means operates and for supplying the processing means with the second clock signal to operate the processing means when the receiving means does not operate.

DESCRIPTION OF THE PREFERRED EMBODIMENTS

Figure 1:
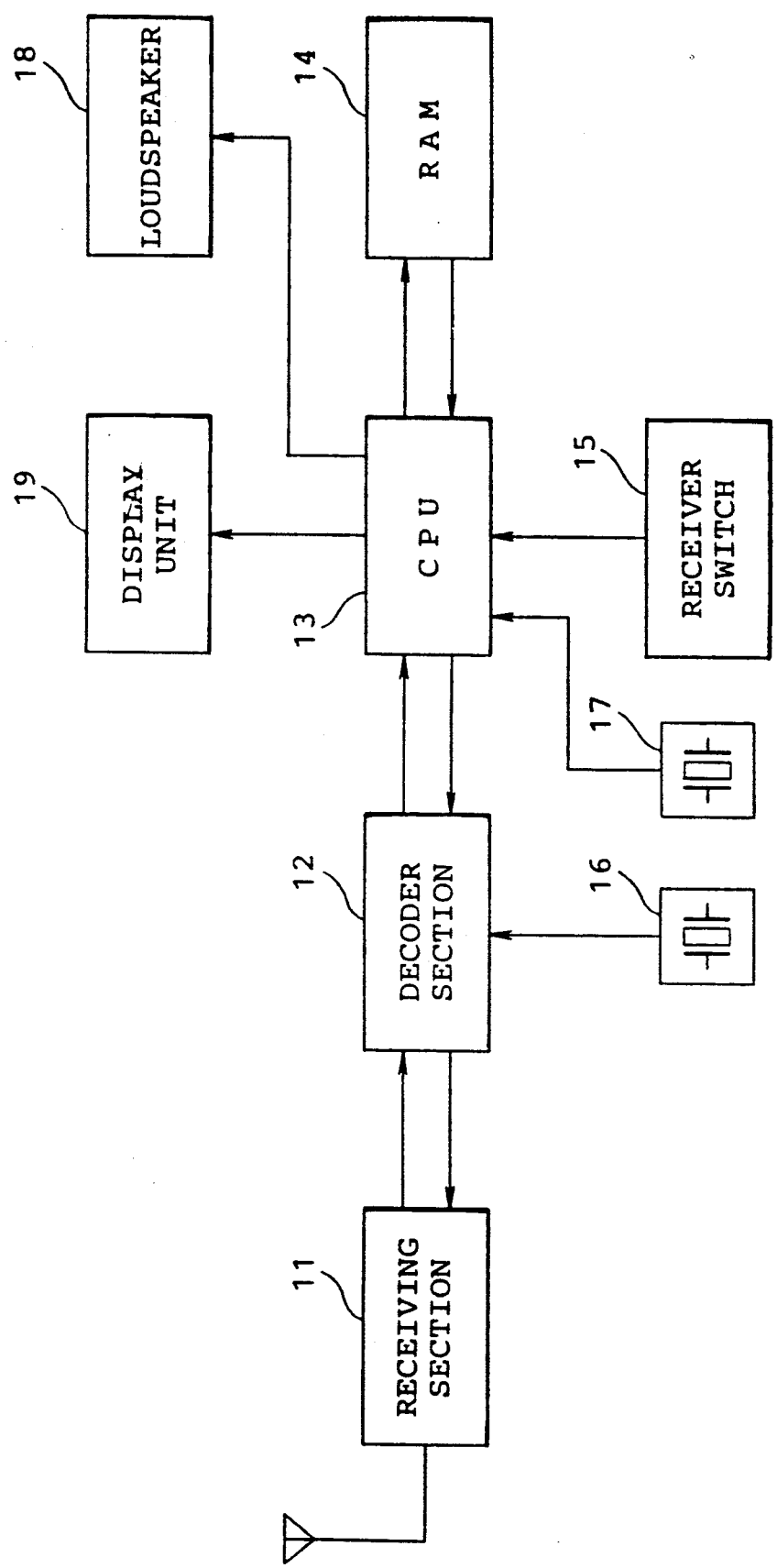
FIG. 1 is a block diagram of a conventional radio paging receiver.

Referring to FIG. 1, description will be made as regards a conventional radio paging receiver for a better understanding of this invention. The illustrated radio paging receiver is for receiving a specific one of a plurality of call signals that is specific to the radio paging receiver. The plurality of call signals (address codewords) are indicative of a plurality of call numbers (radio identification code: RIC), respectively. Each of the call signals may be succeeded by a message signal indicative of a message. The call signals and the message signals are transmitted as a radio signal from a transmitting station (not shown).

Figure 2:
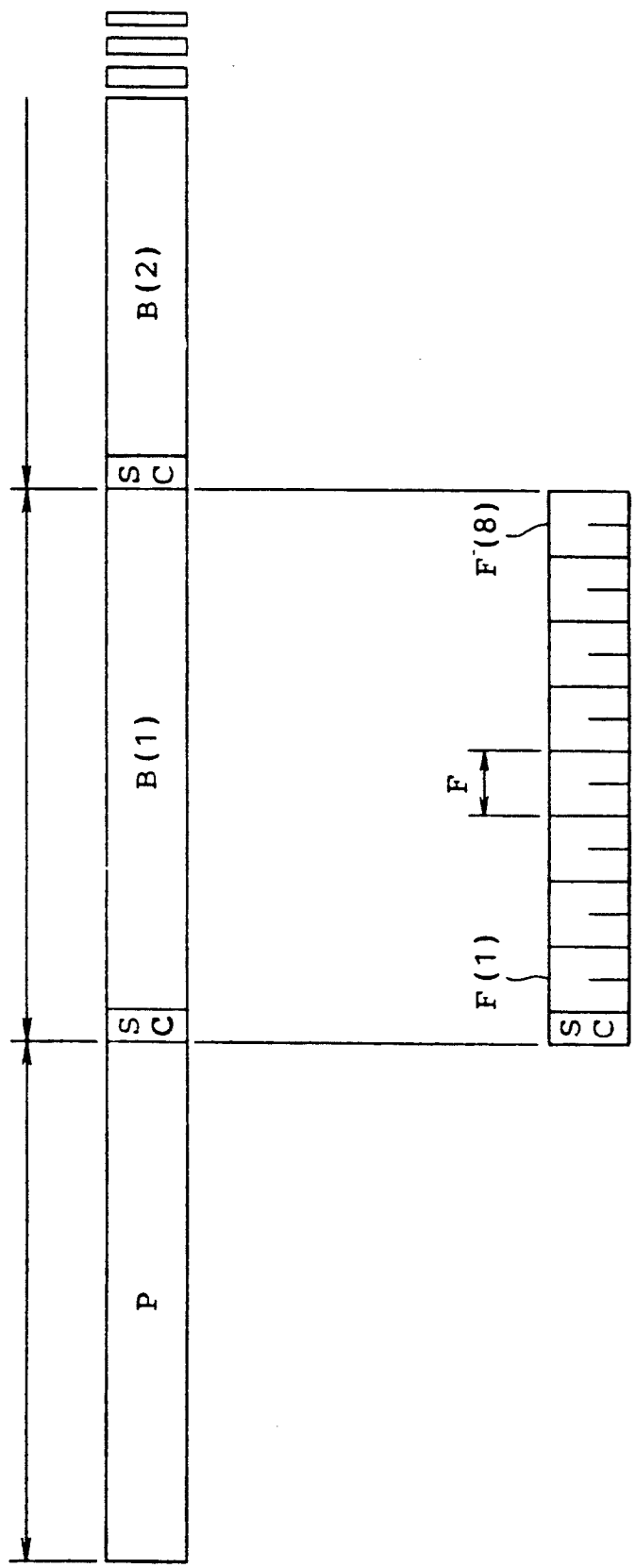
FIG. 2 is a CCIR RPC No. 1 (POCSAG) signal format of a reception signal received by a receiving section shown in FIG. 1.

Turning to FIG. 2, the CCIR Radio Paging code No. 1 (POCSAG code) radio signal comprises a preamble signal P and a first batch B(1), a second batch B(2), and other batches succeeding the preamble signal P. Each batch, represented by B, of the radio signal comprises a frame synchronization signal SC and a plurality of frames F, such as first through eighth frames F(1) to F(8) following the frame synchronization signal SC. The call signal may be succeeded by a message signal. The frame synchronization signal SC serves to establish frame synchronization of the call signal. Each of the frame synchronization signal SC, the call signal, and the message signal consists of BCH codes.

By the way, a plurality of radio paging receivers have call numbers different from each other, respectively, and may be grouped into eight groups. Each of the groups is assigned to one frame of each batch B.

Turning back to FIG. 1, the radio paging receiver comprises a receiving section 11, a decoder section 12, and a central processing unit (CPU) 13, and an external RAM 14. The CPU 13 is implemented by a one-chip central processing unit which may be μPD75308G manufactured and sold by NEC Corporation in Tokyo. The radio paging receiver is activated by a battery (not shown) when a receiver switch 15 is put into the on state. A first clock generator 16 supplies the decoder section 12 with a first clock signal having a first frequency of, for example, 32.768 kHz. The decoder section 12 is put into operable condition by the first clock signal.

Otherwise, a second clock generator 17 supplies the CPU 13 with a second clock signal having a second frequency which is higher than the first frequency. The second frequency may be 4 MHz. The CPU 13 is put into operable condition by the second clock signal. Each of the first and the second clock generators 16 and 17 is depicted as a quartz oscillator.

The decoder section 12 operates in accordance with the first clock signal to supply the receiving section 11 with a first operating signal at a predetermined interval. The receiving section 11 is intermittently put into receiving operation by the first operating signal. The receiving section 11 intermittently receives the radio signal and demodulates the radio signal into a demodulated signal to supply the demodulated signal to the decoder section 12. The decoder section 12 establishes synchronization with the demodulated signal in accordance with the frame synchronization signal SC to receive a specific frame assigned to the radio paging receiver. When the synchronization is established, the decoder section 12 supplies the receiving section 11 with a second operating signal having a leading edge coincident with a leading edge of the specific frame.

After establishment of the synchronization, the decoder section 12 distinguishes the specific call signal from the plurality of call signals. When the specific call signal corresponds to the call number assigned to the radio paging receiver, the decoder section 12 produces a coincidence signal as an interrupt signal to supply the CPU 13 with the coincidence signal. Thereafter, the decoder section 12 supplies the specific call signal and a specific message signal succeeding the specific call signal to the CPU 13.

Figure 3:
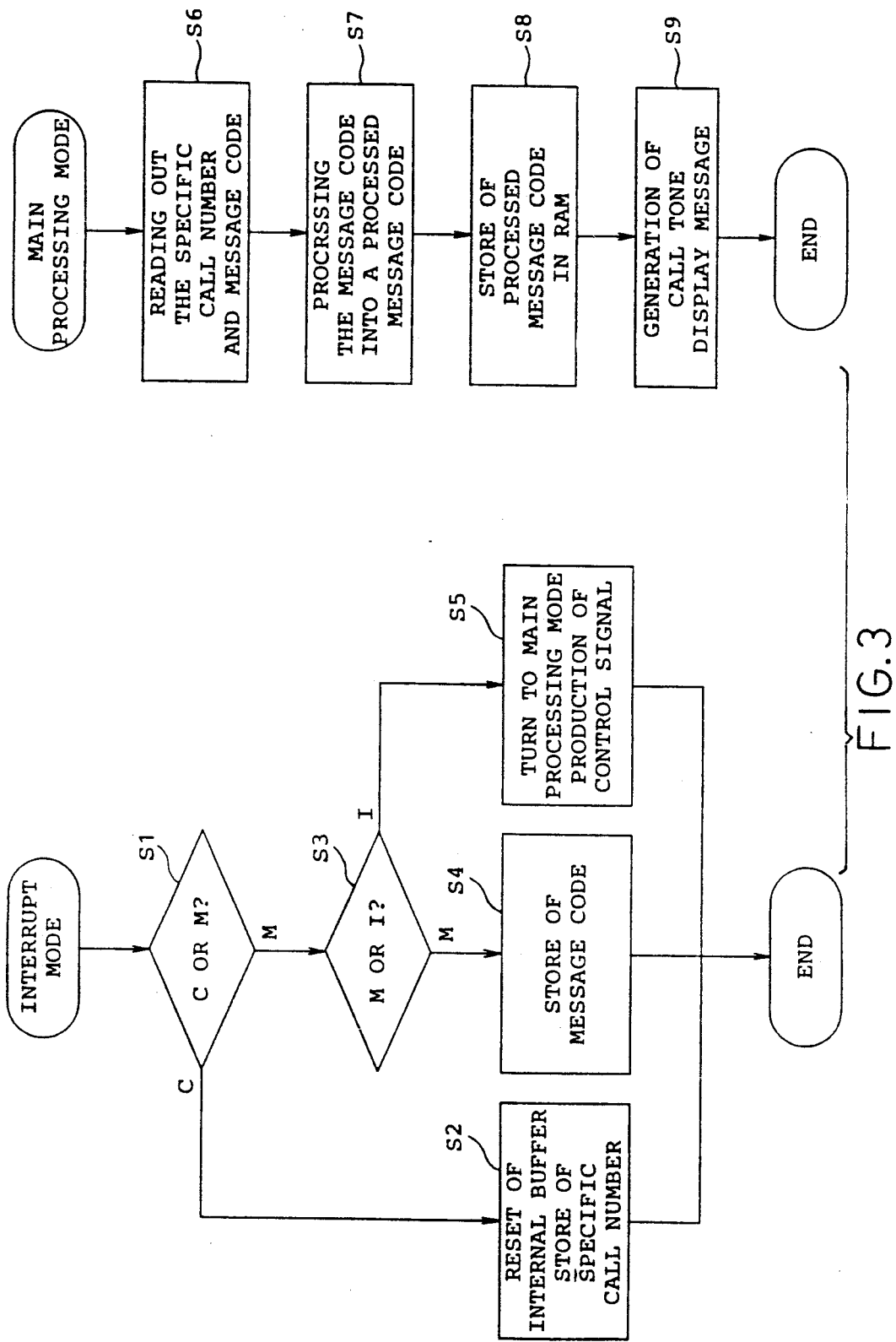
FIG. 3 is a flow chart for describing operation of a central processing unit used in the radio paging receiver shown in FIG. 1.

Referring to FIG. 3 together with FIG. 1, the CPU 13 is put into an interrupt mode when supplied with the coincidence signal. The CPU 13 detects whether the specific call signal or the specific message signal is supplied to the CPU 13 as shown at a first step S1 by C or M. When the CPU 13 detects supply of the specific call signal as indicated along a line labelled C, the first step S1 proceeds to a second step S2 at which operation is carried out to reset an internal buffer (not shown) of the CPU 13 and to store a specific call number indicative of the specific call signal in the internal buffer. When the CPU 13 detects supply of the specific message signal as depicted along a line labelled M, the first step S1 proceeds to a third step S3 at which operation is carried out to detect whether the specific message signal or an idle signal is supplied to the CPU 13 as depicted by M or I. The idle signal is indicative of the end of the specific call signal or the specific message signal. When the CPU 13 detects the specific message signal, the message signal is stored as a specific message code in relation to the specific call number in the internal buffer as shown at a fourth step S4. When the CPU 13 detects the idle signal, the CPU 13 produces a control signal to supply the decoder section 12 with the control signal and is put in a main processing mode from the interrupt mode as shown at a fifth step S5.

The decoder section 12 stops supply of the second operating signal in response to the control signal. As a result, the receiving section 11 stops a receiving operation.

In the main processing mode, the CPU 13 reads out the call number and the message code stored in the internal buffer as shown at a sixth step S6. The sixth step S6 proceeds to a seventh step S7 at which operation is carried out to process the message code into a processed message code for display of the processed message code on a display unit 18. The seventh step S7 proceeds to an eighth step S8 at which operation is carried out to store the processed message code in the external RAM 14. Thereafter, the CPU 13 sends a tone signal to a loudspeaker 19 to make the loudspeaker 19 generate a call tone indicative of a call for the paging receiver under consideration and displays the processed message code as a message on the display unit 18 as shown at a ninth step S9. The CPU 13 stops sending of the tone signal and erases the message from the display unit 18 by putting a reset switch (not shown) into on state.

As described above, the CPU 13 processes at high speed in accordance with the second clock signal the message signal into the processed message signal which is the processed message code. Namely, the CPU 13 is put into operation at a rapid processing speed by the second clock signal when the receiving section 11 is put into operation. The second clock signal inevitably serves as a noise signal in the receiving section 11. As a result, the receiving section 11 is influenced by the noise signal so that its signal to noise ratio drops. Namely, it is difficult to maintain a satisfactory signal to noise ratio at the receiving section 11.

Figure 4:
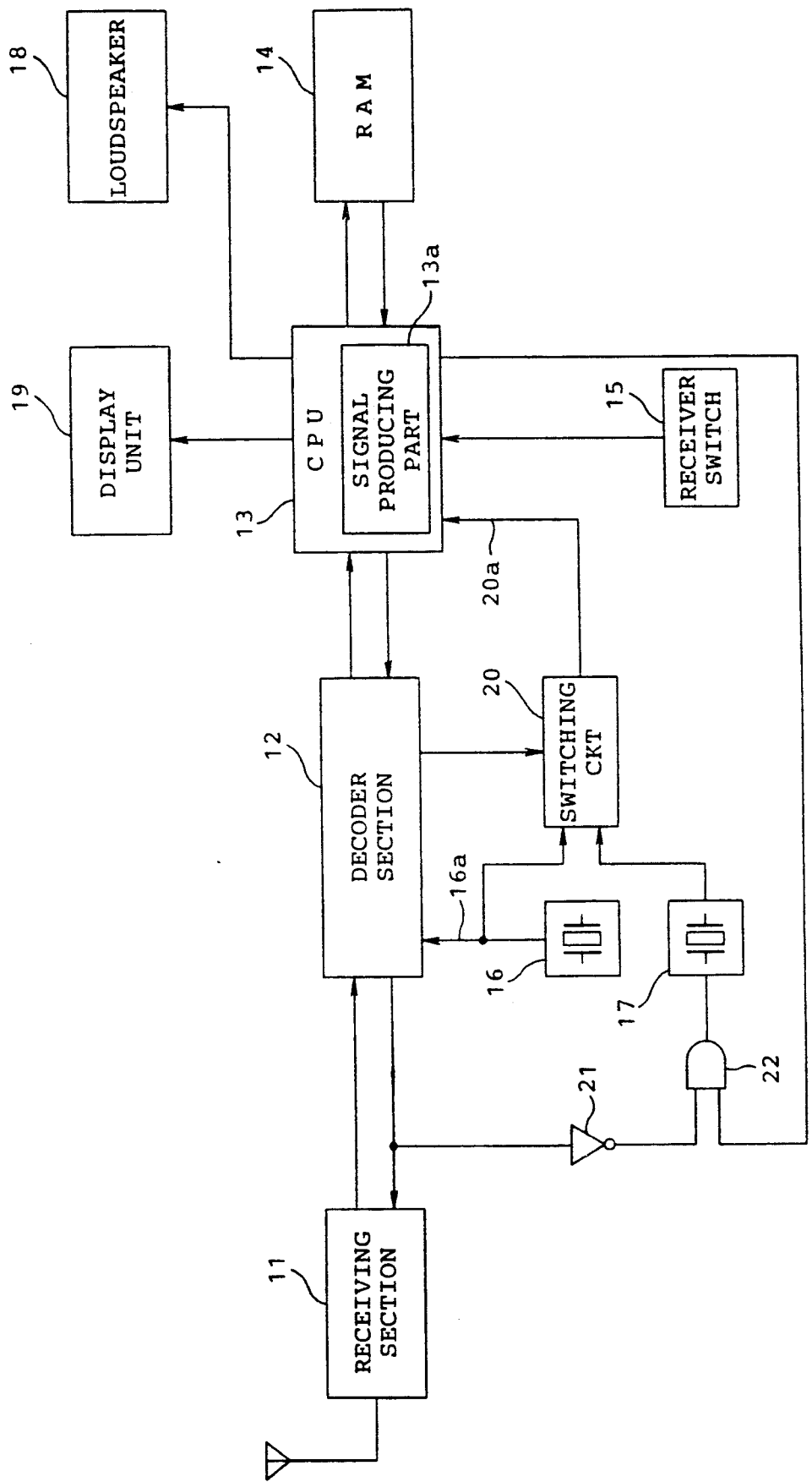
FIG. 4 is a block diagram of a radio paging receiver according to a first embodiment of this invention.

Referring to FIG. 4, description will proceed to a radio paging receiver according to a first embodiment of this invention. The radio paging receiver comprises similar parts which are designated by like reference numerals and are operable with likewise named and denoted signals.

As described above, the receiving section 11 is intermittently put into receiving operation by the first operating signal which is supplied from the decoder section 12. The receiving section 11 intermittently demodulates the radio signal into the demodulated signal to supply the demodulated signal to the decoder section 12 through a signal line depicted upwardly between the receiving section 11 and the decoder section 12. When the decoder section 12 establishes synchronization of the demodulated signal, the decoder section 12 supplies the receiving section 11 with the second operating signal through a signal line which is depicted downwardly between the receiving section 11 and the decoder section 12 and through which the first operating signal is delivered to the receiving section 11. The receiving section 11 is intermittently put into receiving operation by the second operating signal.

In FIG. 4, the paging receiver further comprises a switching circuit 20, an inverter 21, and an AND gate 22. The switching circuit 20 is connected to the first and the second clock generators 16 and 17. The inverter 21 produces an inverted operating signal in response to the second operating signal.

The first clock generator 16 supplies the decoder section 12 with the first clock signal through a first supplying line 16a. The switching circuit 20 is connected to the CPU 13 through a second supplying line 20a. The switching circuit 20 selectively connects the CPU 13 to the first and the second clock generators 16 and 17 by a switching signal which is supplied from the decoder section 12. The CPU 13 supplies the AND gate 22 with a stand-by signal indicative of reception of the specific message signal. The AND gate 22 supplies the second clock generator 17 with a driving signal when the second inverted operating signal and the stand-by signal is supplied. The second clock generator 17 generates the second clock signal in response to the driving signal.

Figure 5:
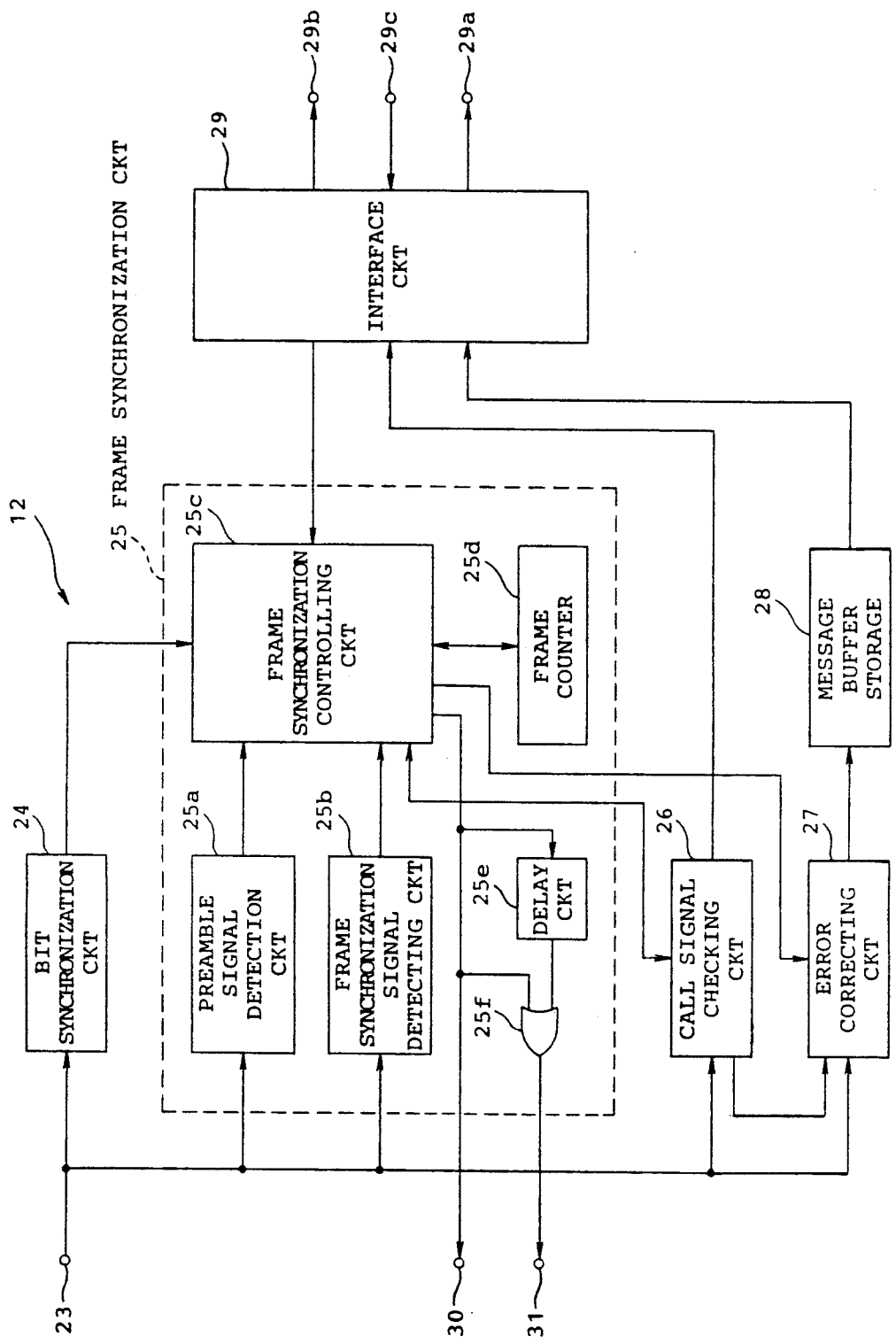
FIG. 5 is a block diagram of a decoder used in the radio paging receiver shown in FIG. 3.

Referring to FIG. 5 together with FIG. 4, the decoder section 12 is put into operation by the first clock signal which is supplied from the first clock generator 16 when the receiver switch 15 is put into the on state. The decoder section 12 intermittently produces the first operating signal to supply the receiving section 11 with the first operating signal. The receiving section 11 is intermittently put into receiving operation by the first operating signal.

The decoder section 12 has a data input terminal 23 and accepts the demodulated signal from the receiving section 11 through the data input terminal 23. The decoder section 12 comprises a bit synchronization circuit 24, a frame synchronization circuit 25, a call signal checking circuit 26, an error correcting circuit 27, a message buffer storage 28, and an interface circuit 29. The demodulated signal is supplied to the bit synchronization circuit 24, the frame synchronization circuit 25, the call signal checking circuit 26, and the error correcting circuit 27. The bit synchronization circuit 24 establishes bit synchronization of the demodulated signal with a bit synchronization clock signal which is produced in the decoder 12 based on the first clock signal. The bit synchronization circuit 24 supplies the frame synchronization circuit 25 with a bit synchronization signal.

The frame synchronization circuit 25 comprises a preamble signal detection circuit 25a, a frame synchronization signal detecting circuit 25b, a frame synchronization controlling circuit 25c, and a frame counter 25d. The frame synchronization controlling circuit 25c has a specific frame number of a frame in which the specific call signal is transmitted. The first operating signal is supplied from the frame synchronization controlling circuit 25c to the receiving section 11. The preamble signal detection circuit 25a detects the preamble signal of the demodulated signal to supply a preamble detection signal to the frame synchronization controlling circuit 25c. The frame synchronization signal detecting circuit 25b detects the frame synchronization signal to supply a frame detection signal to the frame synchronization controlling circuit 25c. The frame synchronization controlling circuit 25c establishes frame synchronization of the demodulated signal with the bit synchronization clock signal by using the bit synchronization signal, the preamble detection signal, and frame detection signal as known in the art.

When the frame synchronization is established, the frame synchronization controlling circuit 25c drives the frame counter 25d. The frame counter 25d starts to count the number of frames in each batch and supplies the frame synchronization controlling circuit 25c with a frame count signal which represents the number of each frame. When the frame number indicative of the frame count signal corresponds to the specific frame number, the frame synchronization controlling circuit 25c generates the second operating signal having a leading edge coincident with a leading edge of the specific frame. The second operating signal is supplied to the receiving section 11 through an operating signal output terminal 30.

Figure 6:
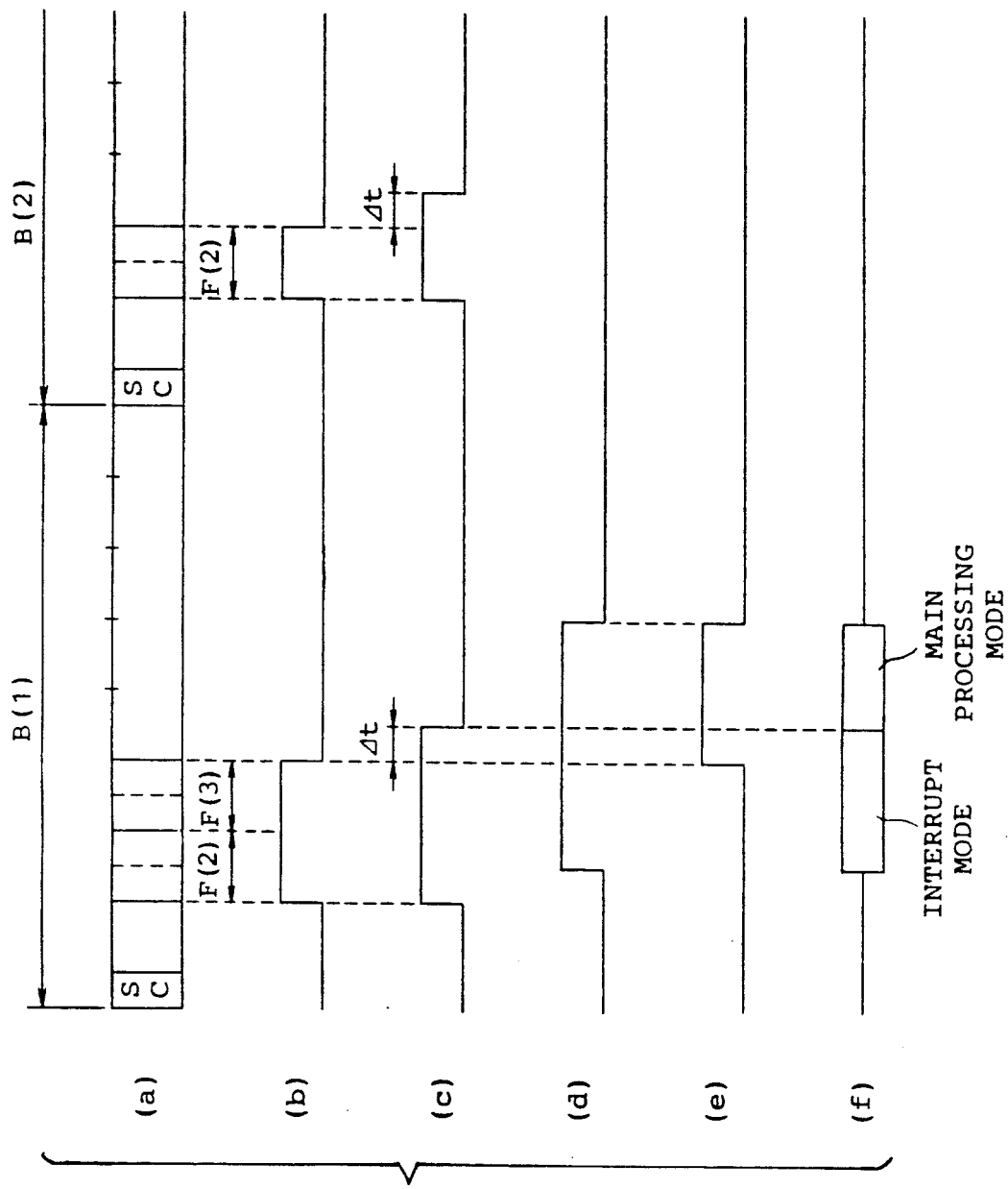
FIG. 6 is a time chart for use in describing operation of the radio paging receiver shown in FIG. 3.

Turning to FIG. 6, the radio signal has a plurality of batches B(1), B(2), and so forth as shown along a first or top row labelled (a). The second frame F(2) of each batch B (suffixes omitted) is assigned to the group to which the radio paging receiver belongs. The second operating signal has a leading edge at the leading edge of each of the frames F(2) of the respective batches as shown along a second row labelled (b). The second operating signal has a trailing edge coincident with a trailing edge of an idle signal as will be described hereinafter. As a result, the receiving section 11 is put into receiving operation during an operating time interval which is determined between the leading edge and the trailing edge of the second operating signal.

Each of the frames has a predetermined length. When the specific message signal indicates a specific message code which is longer than the predetermined length, the specific message signal is transmitted from the transmitting station to the radio paging receiver illustrated in FIG. 4 by using the second frame F(2) and the third frame F(3). The specific message signal is followed by an idle signal indicative of the end of the message signal as shown in the first row labelled (a). Another call signal assigned to another radio paging receiver may be transmitted by the second frame F(2) in the second batch B(2) as shown along the first row labelled (a). The other call signal is followed by an idle signal.

Turning back to FIG. 5, the frame synchronization controlling circuit 25c drives the call signal checking circuit 26 and the error correcting circuit 27 when the frame synchronization is established. As a result, the call signal checking circuit 26 checks the specific call signal of the second frame F(2) in the first batch B(1). The error correcting circuit 27 corrects the specific call signal of the second frame F(2) in the first batch B(1) to produce a corrected call signal. When the specific call signal corresponds to the call number assigned to the paging receiver, the call signal checking circuit 26 produces a coincidence signal. The coincidence signal is supplied to the error correcting circuit 27. The error correcting circuit 27 writes the corrected call signal as a specific call number to the message buffer storage 28. Similarly, the error correcting circuit 27 corrects the specific message signal succeeding the specific call signal to produce a corrected message signal and writes the corrected message signal as a specific message code in the message buffer storage 28 in relation to the specific call number. The coincidence signal is supplied as an interrupt signal from an interrupt terminal 29a to the CPU 13 through the interface circuit 29.

The second operating signal is supplied to a delay circuit 25e to be given a predetermined delay ($\Delta t$) of, for example, 10 msec. The delay circuit 25e produces a delayed operating signal to supply the delayed operating signal to an OR gate 25f. The OR gate 25f produces the switching signal in response to the second operating signal and the delayed operating signal as shown along a third row labelled (c). The switching signal is supplied to the switching circuit 20 through a switching signal output terminal 31.

Again referring to FIG. 4 together with FIGS. 5 and 6, the CPU 13 is connected to the first clock generator 16 by the switching circuit 20 and is put into operation by the first clock signal. When the coincidence signal is supplied to the CPU 13, the CPU 13 is put into the interrupt mode as described above. The specific call number and the specific message code are supplied from the message buffer storage 28 to the CPU 13 through the interface circuit 29 and a data output terminal 29b.

The CPU 13 comprises a signal producing part 13a. When the signal producing part 13a receives the specific message code, the signal producing part 13a produces the stand-by signal indicative of reception of the specific message code to supply the AND gate 22 with the stand-by signal as shown in a fourth row labelled (d). Otherwise, the inverted operating signal is supplied to the AND gate 22. The AND gate 22 produces the driving signal. The driving signal has a leading edge coincident with the leading edge of the inverted operating signal and a trailing edge coincident with the trailing edge of the stand-by signal as shown in a fifth row labelled (e).

The CPU 13 carries out an interrupt processing similar to the interrupt processing shown in FIG. 3 when supplied with the coincidence signal. When the CPU 13 detects the idle signal, the CPU 13 produces the control signal. The control signal is supplied from the CPU 13 to the frame synchronization controlling circuit 25c through a control signal input terminal 29c and the interface circuit 29. The frame synchronization controlling circuit 25c stops supply of the second operating signal in response to the control signal. As a result, the receiving section 11 stops a receiving operation. The OR gate 25f stops delivery of the switching signal when the predetermined delay (Δt) lapses from stop of receiving operation.

The second clock generator 17 is driven in response to the leading edge of the driving signal and generates the second clock signal. The switching circuit 20 connects the second clock generator 17 with the CPU 13 in response to the trailing edge of the switching signal after the predetermined delay (Δt). As a result, the CPU 13 is put in the main processing mode from the interrupt mode.

The CPU 13 is put into operation at a rapid speed by the second clock signal in the main processing mode. The CPU 13 carries out a main processing similar to the main processing shown in FIG. 3. When the CPU 13 ends the main processing, the signal producing part 13a stops supply of the stand-by signal. The second clock generator 17 stops generation of the second clock signal.

As described above, the CPU 13 is put into operation by the first clock signal in the interrupt mode and is put into operation by the second clock signal in the main processing mode.

Continuously referring to FIGS. 4 to 6, the decoder section 12 supplies the receiving section 11 with the second operating signal of which a leading edge is coincident with the leading edge of the second frame F(2) in the second batch B(2) as shown in the first row labelled (a). The receiving section 11 is put into operation. The decoder section 12 supplies the switching circuit 20 with the switching signal having a leading edge coincident with the leading edge of the second operating signal. The switching circuit 20 connects the CPU 13 with the first clock generator 16 in response to the leading edge of the switching signal. The CPU 13 is put into operation by the first clock signal.

In case where another call signal which is assigned to another radio paging receiver is transmitted in the second frame F(2) of the second batch B(2), the call signal checking circuit 26 judges that the other call signal does not correspond to the specific call signal. The call signal checking circuit 26 produces a discrepancy signal to supply the frame synchronization controlling circuit 25c with the discrepancy signal.

When supplied with the discrepancy signal, the frame synchronization controlling circuit 25c continues delivery of the second operating signal during the interval of the second frame F(2) as shown in the second row labelled (b). The frame synchronization controlling circuit 25c stops supply of the second operating signal as shown in the second row labelled (b) after the interval of the second frame F(2) lapses.

When the predetermined delay (Δt) lapses after stop of the second operating signal, the delayed operating signal is stopped as described above. As a result, supply of the switching signal is stopped. The switching circuit 20 connects the CPU 13 with the second generator 17 in response to the trailing edge of the switching signal. In this event, the signal producing part 13a does not produce the stand-by signal because the signal producing part 13a does not receive the specific call signal. Therefore, the second clock generator 17 does not generate the second clock signal so that the second clock signal is not supplied to the CPU 13.

Figure 7:
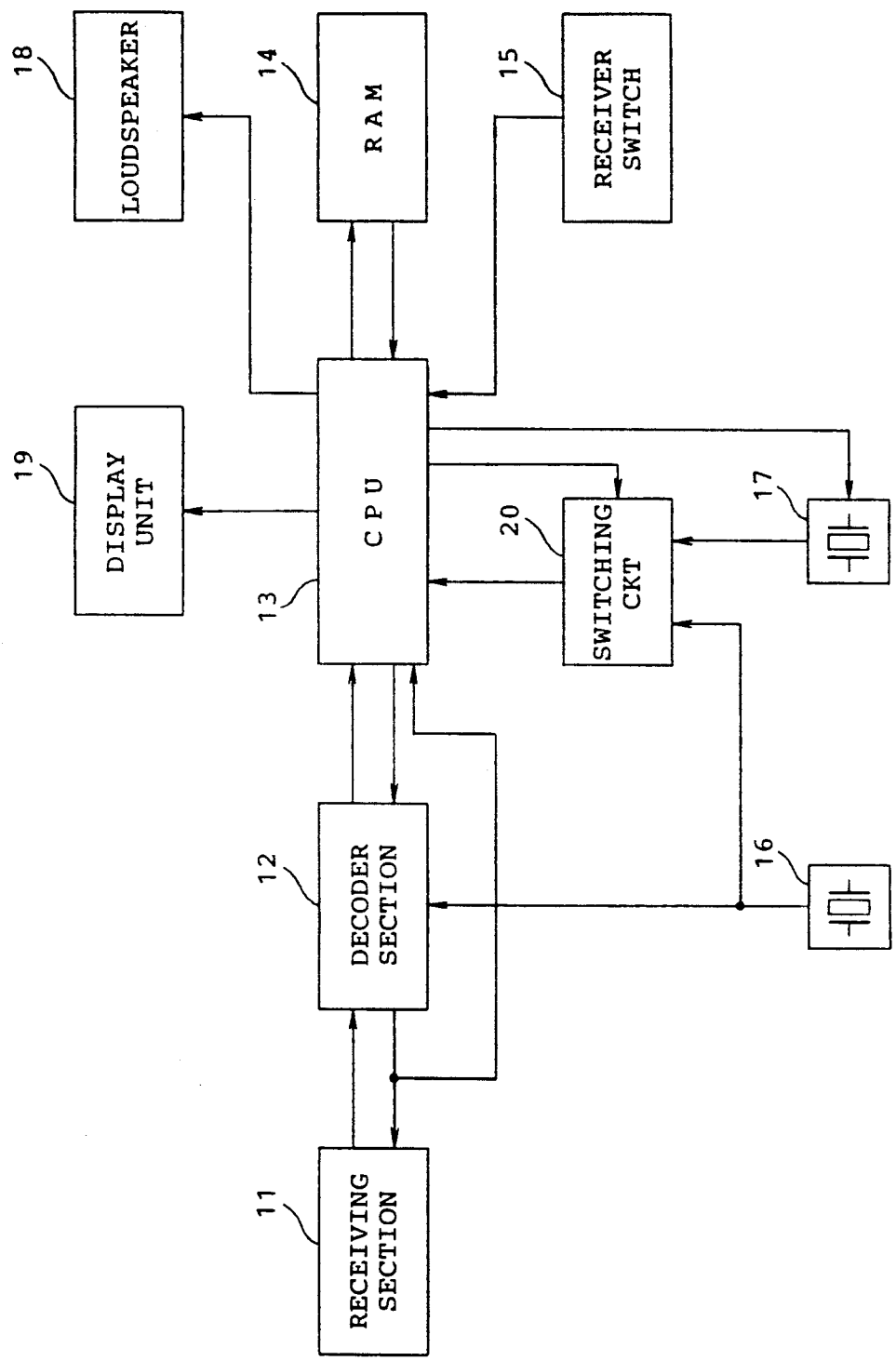
FIG. 7 is a block diagram of a radio paging receiver according to a second embodiment of this invention.

Referring now to FIG. 7, description will be directed to a radio paging receiver according to a second embodiment of this invention. In the second embodiment, the second clock generator 17 and clock switching circuit 20 is controlled by the CPU software. The radio paging receiver comprises similar parts which are designated by like reference numerals and are operable with likewise named and denoted signals.

As in the conventional radio paging receiver and in the radio paging receiver illustrated with reference to FIG. 4, the second decoder section 12 is put into operation by the first clock signal. The decoder section 12 intermittently supplies the second operating signal to the receiving section 11 and the CPU 13.

The receiving section 11 is put into receiving operation by the second operating signal and supplies the decoder section 12 with the demodulated signal. The decoder section 12 is responsive to the demodulated signal and distinguishes the specific call signal from the plurality of call signals to supply the CPU 13 with the coincident signal.

Figure 8:
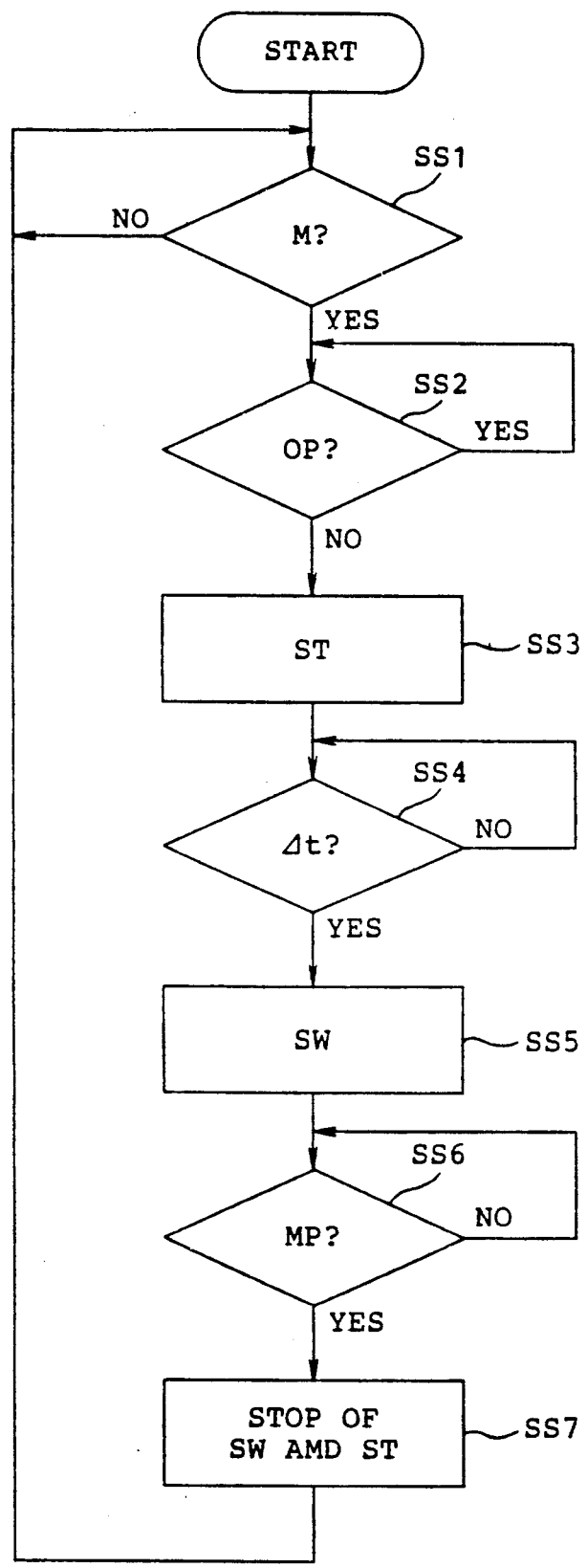
FIG. 8 is a flow chart for describing operation of a central processing unit used in the radio paging receiver shown in FIG. 7.
Figure 9:
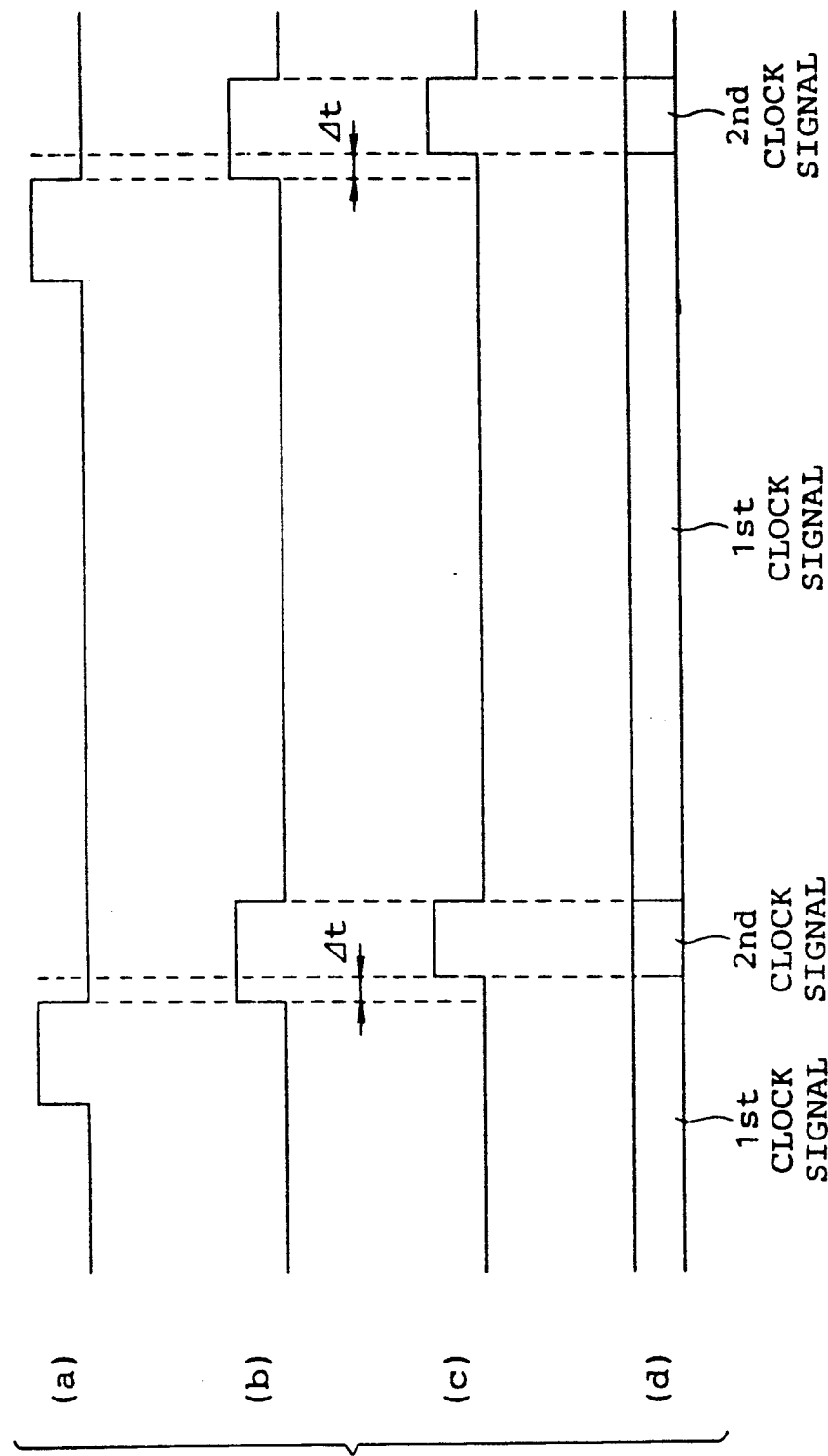
FIG. 9 is a time chart for describing operation of the radio paging receiver shown in FIG. 7.

Referring to FIGS. 8 and 9 together with FIG. 7, the CPU 13 is connected to the first clock generator 16 through the switching circuit 20. The CPU 13 is put into operation by the first clock signal. The decoder section 12 supplies the CPU 13 with the second operating signal as shown in FIG. 9 along a first or top row labelled (a) after the establishment of synchronization. The CPU 13 is put into the interrupt mode when supplied with the coincident signal.

After put into the interrupt mode, the CPU 13 detects whether the specific message signal M is supplied from the decoder section 12 or not as shown at a first step SS1 by a mere notation of M. When the CPU 13 does not detect supply of the specific message signal, the first step SS1 is again executed. When the CPU 13 detects supply of the specific message signal, the first step SS1 proceeds to a second step SS2 at which operation is carried out to detect whether the second operating signal OP is supplied from the decoder section 12 or not as indicated merely by OP. When the CPU 13 detects supply of the second operating signal OP, the second step SS2 is repeatedly executed.

When the CPU 13 does not detect the second operating signal, namely, the receiving section 11 is not put into receiving operation, the second step SS2 is followed by a third step SS3 at which operation is carried out to produce the stand-by signal ST as a driving signal as indicated merely by ST. The stand-by signal has a leading edge coincident with the trailing edge of the second operating signal as shown in a second row labelled (b). The second clock generator 17 produces the second clock signal in response to a leading edge of the stand-by signal.

The third step SS3 proceeds to a fourth step SS4 at which operation is carried to detect whether or not the predetermined delay ($\Delta t$) lapses as indicated merely by $\Delta t$ after stop of the second operating signal. When the predetermined delay ($\Delta t$) does not lapse, the fourth step SS4 is again executed. When the predetermined delay ($\Delta t$) lapses, the fourth step SS4 proceeds to a fifth step SS5 at which operation is carried out to produce the switching signal SW as shown in a third row labelled (c). The switching circuit 20 connects the second clock generator 17 with the CPU 13 in response to the leading edge of the switching signal. As a result, the second clock signal is supplied to the CPU 13 as shown in a fourth row labelled (d). When the CPU 13 supplies the switching circuit 20 with the switching signal, the CPU 13 is put into the main processing mode. The CPU 13 processes the specific message code into the processed message code at a rapid processing speed.

The fifth step SS5 is followed by a sixth step SS6 at which operation is carried out to judge whether the main processing ends or not as indicated merely by MP. When the main processing does not end, the sixth step is repeatedly executed. When the main processing ends, the CPU 13 stops supply of the switching signal SW and the stand-by signal ST as shown in the second and third rows labelled (b) and (c), respectively, in a seventh step SS7. The second clock generator 17 stops generation of the second clock signal in response to the trailing edge of the stand-by signal. The switching circuit 20 connects the CPU 13 with the first clock generator 16 in response to the trailing edge of the switching signal. The first clock signal is supplied to the CPU 13 as shown in the fourth row labelled (d). Operation returns back to the first step SS1.

What is claimed is:

1. In a radio communication apparatus comprising receiving means intermittently put into operation for receiving a plurality of call signals and a plurality of additional signals succeeding said call signals, respectively, distinguishing means connected to said receiving means for distinguishing a specific one of said call signals which is specific to said apparatus in order to receive a specific additional signal succeeding said specific call signal among said plurality of additional signals, processing means connected to said distinguishing means for processing said specific additional signal into a processed additional signal, and operating means for operating said distinguishing means and said processing means, the improvement wherein said operating means comprises:

first clock generating means for generating a first clock signal having a first frequency;

second clock generating means for generating a second clock signal having a second frequency which is higher than said first frequency;

first supplying means for supplying said distinguishing means with said first clock signal to operate said distinguishing means; and second supplying means for supplying first clock signal to said processing means to operate said processing means when receiving means is put into operation, and, otherwise, for supplying said second clock signal when to said processing means to operating said processing means.

2. In a radio communication apparatus comprising receiving means intermittently put into operation for receiving a plurality of call signals and a plurality of additional signals succeeding said call signals, respectively;

said apparatus further comprising operating signal producing means for intermittently producing an operating signal for use in putting said receiving means into operation;

delay means for delaying said operating signal with a predetermined time duration to produce a delayed operating signal;

switching signal producing means for producing a switching signal in response to said operating signal and said delayed operating signal;

distinguishing means connected to said receiving means for distinguishing a specific one of said call signals which is specific to said apparatus in order to receive a specific additional signal succeeding said specific call signal among said plurality of additional signals;

stand-by signal producing means connected to said distinguishing means for producing a stand-by signal indicative of a reception of said specific additional signal when said distinguishing means distinguishes said specific one of said call signals;

processing means connected to said distinguishing means for processing said specific additional signal into a processed additional signal; operating means for operating said distinguishing means and said processing means;

first clock generating means for generating a first clock signal having a first frequency;

second clock generating means for generating a second clock signal having a second frequency which is higher than said first frequency;

first supplying means for supplying said distinguishing means with said first clock signal to operate said distinguishing means;

second supply means for supplying first clock signal to said processing means to operate said processing means when receiving means is put into operation, and, otherwise, for supplying said second clock signal to said processing means to operate said processing means;

said second supplying means further comprising:

driving means responsive to said operating signal and said stand-by signal for driving said second clock generating means; and switching means responsive to said switching signal for connecting said second clock generating means to said processing means.

3. In a radio communication apparatus, comprising receiving means intermittently put into operation for receiving a plurality of call signals and a plurality of additional signals succeeding said call signals, respectively;

said apparatus further comprising operating signal producing means for intermittently producing an operating signal for use in putting said receiving means into operation;

distinguishing means connected to said receiving means for distinguishing a specific one of said call signals which is specific to said apparatus in order to receive a specific additional signal succeeding said specific call signal among said plurality of additional signals, processing means connected to said distinguishing means for processing said specific additional signal into a processed additional signal, operating means for operating said distinguishing means and said processing means, the improvement wherein said operating means comprises:

first clock generating means for generating a first clock signal having a first frequency;

second clock generating means for generating a second clock signal having a second frequency which is higher than said first frequency;

driving signal producing means for producing a driving signal for use in driving said second clock generating means when said operating signal producing means stops producing said operating signal;

switching signal producing means responsive to said operating signal for producing a switching signal after a predetermined time duration;

first supplying means for supplying said distinguishing means with said first clock signal to operate said distinguishing means; and second supplying means for supplying said first clock signal to said processing means to operate said processing means when receiving means is put into operation, and, otherwise, for supplying said second clock signal to said processing means to operating said processing means; and said second supplying means further comprises:

switching means responsive to said switching signal for connecting said second clock generating means to said processing means.

4. A receiver comprising:

first means intermittently put into operation for receiving a coded signal in order to produce said coded signal as a received signal during the operation;

second means coupled to said first means for decoding said received signal into a decoded signal;

first clock generating means for generating a first clock signal having a first frequency;

second clock generating means for generating a second clock signal having a second frequency which is higher than said first frequency; and control means coupled to said first means, said second means, and said first and said second generating means for supplying said second clock signal to said second means when said first means is not put into operation, said control means stopping the supply of said second clock signal to said second means in order to supply said first clock to said second means when said first means is put into operation.

5. A selective calling radio receiver comprising:

receiver means for receiving a coded signal to produce said received signal as a received signal;

decoder means coupled to said receiver means for decoding said coded signal into a decoded signal;

data processing means coupled to said decoder means for processing said decoded signal into a processed signal;

selecting means coupled to said decoder means and said data processing means for selecting one of first and second clock signals as a selected clock signal to supply said selected clock signal to said data processing means;

first clock generating means coupled to said decoder means, said data processing means, and said selecting means for generating said first clock signal;

second clock generating means coupled to said selecting means and said data processing means for generating said second clock signal which has a frequency that is higher than the frequency of said first clock signal; and deactivating means coupled to said decoder means, said receiving means, and said second clock generating means when said receiving means is put into operation.

6. A selective calling radio receiver claimed in claim 5, further comprising activating means coupled to said decoder means, said second clock generating means, and said receiving means for activating said second clock generating means when said receiving means is not put into operation.

7. A selective calling radio receiver claimed in claim 6, wherein said selecting means selects one of said first and said second clock signals in response to the output of said decoder means.

* * * * *